United States Patent
Akkarakaran et al.

(10) Patent No.: US 11,496,965 B2
(45) Date of Patent: Nov. 8, 2022

(54) POWER CONTROL WITH FLEXIBLE SCHEDULING DELAY

(71) Applicant: QUALCOMM Incorporated, San Diego, CA (US)

(72) Inventors: Sony Akkarakaran, Poway, CA (US); Xiao Feng Wang, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,615

(22) Filed: Nov. 6, 2020

(65) Prior Publication Data

US 2021/0058870 A1 Feb. 25, 2021

Related U.S. Application Data

(62) Division of application No. 16/407,735, filed on May 9, 2019, now Pat. No. 10,856,234.

(Continued)

(51) Int. Cl.
*H04W 52/08* (2009.01)
*H04W 52/14* (2009.01)
*H04W 72/14* (2009.01)

(52) U.S. Cl.
CPC ......... *H04W 52/146* (2013.01); *H04W 72/14* (2013.01)

(58) Field of Classification Search
CPC ....... H04W 52/04; H04W 52/38; H04W 4/40; H04W 52/06; H04W 4/46; H04W 52/58;

(Continued)

(56) References Cited

U.S. PATENT DOCUMENTS 10,051,500 B2   8/2018  Kim et al.
2012/0224552 A1* 9/2012 Feuersanger ......... H04L 5/0064
                                                  370/329

(Continued)

FOREIGN PATENT DOCUMENTS

EP    3499980 A1   6/2019
EP    3499980 A1   6/2019

(Continued)

OTHER PUBLICATIONS

Taiwan Search Report—TW108116183—TIPO—dated Jun. 5, 2022.

(Continued)

*Primary Examiner* — Tu X Nguyen
(74) *Attorney, Agent, or Firm* — Qualcomm Incorporated

(57) ABSTRACT

Various aspects of the present disclosure generally relate to wireless communication. In some aspects, a user equipment (UE) may receive a transmit power control (TPC) command in a grant associated with transmitting an uplink communication. A scheduling delay between the grant and the uplink communication may be a flexible scheduling delay. The UE may sample a TPC state in association with determining a transmit power, and may determine the transmit power based at least in part on the TPC state and the TPC command. In some aspects, a UE may detect a power headroom report (PHR) trigger associated with a carrier of a plurality of carriers. The UE may identify a set of carriers that is to be ignored when calculating a power headroom, and may calculate the power headroom based at least in part on ignoring the identified set of carriers. Numerous other aspects are provided.

30 Claims, 7 Drawing Sheets

Related U.S. Application Data

(60) Provisional application No. 62/670,564, filed on May 11, 2018.

(58) Field of Classification Search
CPC ..... H04W 72/14; H04W 52/08; H04W 52/10; H04W 52/00
See application file for complete search history.

(56) References Cited

U.S. PATENT DOCUMENTS

| | | | |
|---|---|---|---|
| 2012/0257519 | A1 | 10/2012 | Frank et al. |
| 2013/0070611 | A1* | 3/2013 | Ahn ............... H04W 52/286 370/328 |
| 2017/0208554 | A1 | 7/2017 | Hoshino et al. |
| 2018/0103433 | A1 | 4/2018 | Li et al. |
| 2018/0279339 | A1 | 9/2018 | Lohr et al. |
| 2019/0349862 | A1 | 11/2019 | Akkarakaran et al. |

FOREIGN PATENT DOCUMENTS

| | | | |
|---|---|---|---|
| WO | 2015018033 | A1 | 2/2015 |
| WO | WO-2015018033 | A1 | 2/2015 |
| WO | 2018028104 | A1 | 2/2018 |
| WO | WO-2018028104 | A1 | 2/2018 |
| WO | 2018205257 | | 11/2018 |
| WO | WO-2018205257 | | 11/2018 |
| WO | 2018228437 | A1 | 12/2018 |
| WO | WO-2018228437 | A1 | 12/2018 |

OTHER PUBLICATIONS

Huawei et al., "General Considerations on UL Power Control Design", 3GPP TSG RAN WG1 Meeting # 90, R1-1712234, Prague, Czech Republic, Aug. 21-25, 2017, 8 pages.
Huawei et al., "General Considerations on UL Power Control Design", 3GPP TSG RAN WG1 Meeting NR#3, R1-1715478, Nagoya, Japan, Sep. 18-21, 2017, 8 pages.
International Search Report and Written Opinion—PCT/US2019/031816—ISA/EPO—dated Nov. 20, 2019.
Lenovo, et al., "PHR for CA with sTTI", 3GPP TSG-RAN WG1 #92, 3GPP Draft; R1-1802673_STTI_PHR_V1, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 17, 2018, 3 Pages, XP051398107, Retrieved from the Internet: URL: https://www.3gpp.org/ftp/tsg_ran/WG1_RL1/TSGR1_92/Docs/ [retrieved on Feb. 17, 2018].
Lenovo, et al., "PHR for NR CA", 3GPP TSG-RAN WG2 #101,3GPP Draft; R2-1803111, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018, Feb. 15, 2018, 3 Pages, XP051399678, Retrieved from the Internet: URL: https://www.3gpp.org/ftp/TSG_RAN/WG2_RL2/TSGR2_101/Docs/ [retrieved on Feb. 15, 2018].
Lenovo, et al., "PHR MAC CE Format," 3GPP TSG-RAN WG2 Meeting #100, 3GPP Draft, R2-1712916, 3rd Generation Partnership Project (3GPP), Mobile Competence Centre, 650, Route Des Lucioles, F-06921, Sophia-Antipolis Cedex, France, vol. RAN WG2, No. Reno, USA; Nov. 27, 2017-Dec. 1, 2017, Nov. 16, 2017 (Nov. 16, 2017), XP051371068, 3 Pages, Retrieved from the Internet: URL: https://www.3gpp.org/ftp/tsg_ran/WG2_RL2/TSGR2_100/Docs/[retrieved on Nov. 16, 2017], section 2.
LG Electronics: "PHR Operation for Dual Connectivity", 3GPP Draft; R2-140742 PHR Operation for Dual Connectivity, 3rd Generation Partnership Project (3GPP) , Mobile Competence Centre; 650, Route Des Lucioles; F-06921 Sophia-Antipolis Cedex; France, vol. RAN WG2, No. Prague, Czech Republic; Feb. 10, 2014-Feb. 14, 2014 Feb. 9, 2014, XP050792031, Retrieved from the Internet: URL:http://www.3gpp.org/ftp/Meetings_3GPP_SYNC/RAN2/Docs/ [retrieved on Feb. 9, 2014], 3 pages.
Mediatek Inc: "Remaining Issues of UL Power Control", 3GPP Draft, 3GPP TSG RAN WG1 RAN1 Meeting #92-Bis, R1-1804069 Remaining Issues of UL Power Control Final, 3rd Generation Partnership Project (3GPP), Mobile Competence Centre, 650 Route Des Lucioles, F-06921 Sophia-Antipolis Cedex, Fran, vol. RAN WG1, No. Sanya, China, Apr. 16, 2018-Apr. 20, 2018, Apr. 15, 2018 (Apr. 15, 2018), XP051426358, 6 Pages, Retrieved from the Internet: URL:http://www.3gpp.org/Meetings%5F3GPP%5FSYNC/RAN1/Docs/ retrieved on Apr. 15, 2018] the whole document, secitions 2 and 4.
Partial International Search Report—PCT/US2019/031816—ISA/EPO—dated Jul. 25, 2019.
Qualcomm Incorporated: "Power Sharing for LTE-NR Dual Connectivity", 3GPP TSG RAN WG1 Meeting #90, R1-1713478, Prague, Czech Republic, Aug. 21-25, 2017, 3 pages.

\* cited by examiner

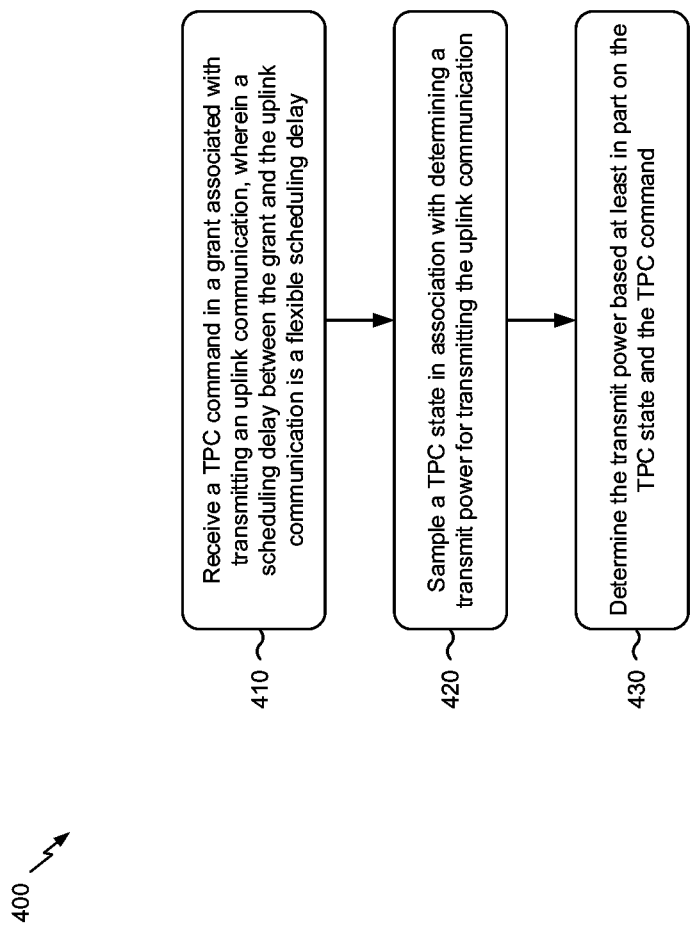

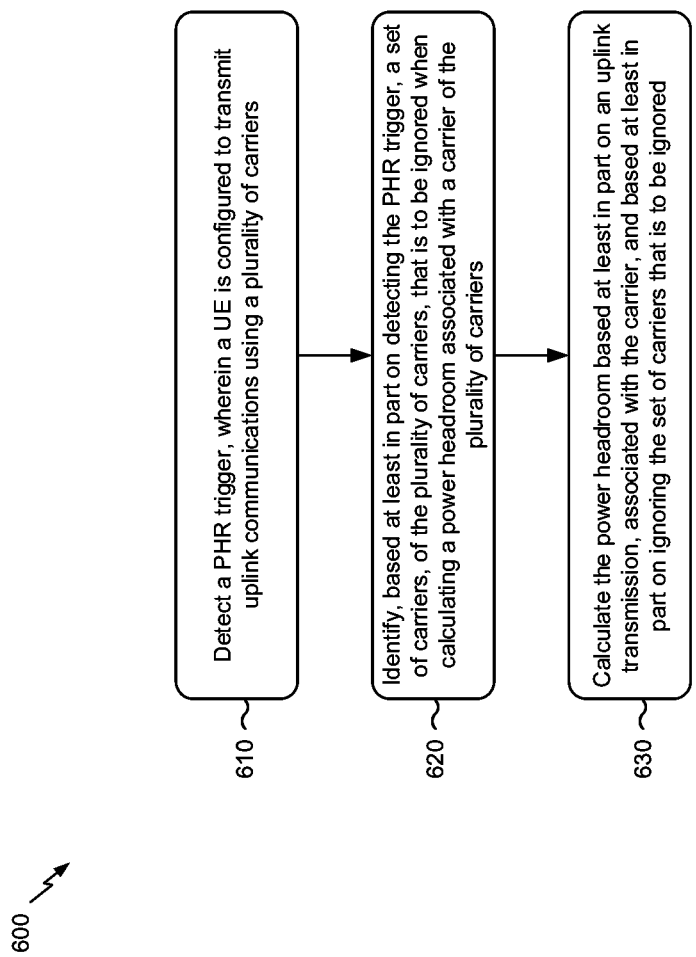

POWER CONTROL WITH FLEXIBLE SCHEDULING DELAY

CROSS REFERENCE TO RELATED APPLICATION UNDER 35 U.S.C § 119

This application is a divisional of U.S. patent application Ser. No. 16/407,735, entitled "POWER CONTROL WITH FLEXIBLE SCHEDULING DELAY," filed May 9, 2019, which claims priority to U.S. Provisional Application No. 62/670,564, filed on May 11, 2018, entitled "TECHNIQUES AND APPARATUSES FOR POWER CONTROL WITH FLEXIBLE SCHEDULING DELAY," which are hereby expressly incorporated by reference herein.

FIELD OF THE DISCLOSURE

Aspects of the present disclosure generally relate to wireless communication, and more particularly to techniques and apparatuses for power control with flexible scheduling delay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication, performed by a user equipment, may include receiving a transmit power control (TPC) command in a grant associated with transmitting an uplink communication, wherein a scheduling delay between the grant and the uplink communication is a flexible scheduling delay; sampling a TPC state in association with determining a transmit power for transmitting the uplink communication; and determining the transmit power based at least in part on the TPC state and the TPC command.

In some aspects, a user equipment for wireless communication may include memory and one or more processors configured to receive a TPC command in a grant associated with transmitting an uplink communication, wherein a scheduling delay between the grant and the uplink communication is a flexible scheduling delay; sample a TPC state in association with determining a transmit power for transmitting the uplink communication; and determine the transmit power based at least in part on the TPC state and the TPC command.

In some aspects, a non-transitory computer-readable medium may store one or more instructions for wireless communication. The one or more instructions, when executed by one or more processors of a user equipment, may cause the one or more processors to receive a TPC command in a grant associated with transmitting an uplink communication, wherein a scheduling delay between the grant and the uplink communication is a flexible scheduling delay; sample a TPC state in association with determining a transmit power for transmitting the uplink communication; and determine the transmit power based at least in part on the TPC state and the TPC command.

In some aspects, an apparatus for wireless communication may include means for receiving a TPC command in a grant associated with transmitting an uplink communication, wherein a scheduling delay between the grant and the uplink communication is a flexible scheduling delay; means for sampling a TPC state in association with determining a transmit power for transmitting the uplink communication; and means for determining the transmit power based at least in part on the TPC state and the TPC command.

In some aspects, a method for wireless communication, performed by a user equipment, may include detecting a power headroom report (PHR) trigger, wherein the user equipment is configured to transmit uplink communications using a plurality of carriers; identifying, based at least in part on detecting the PHR trigger, a set of carriers, of the plurality of carriers, that is to be ignored when calculating a power headroom associated with a carrier of the plurality of carriers; and calculating the power headroom based at least in part on an uplink transmission, associated with the carrier, and based at least in part on ignoring the set of carriers that is to be ignored.

In some aspects, a user equipment for wireless communication may include memory and one or more processors configured to detect a PHR trigger, wherein the user equipment is configured to transmit uplink communications using a plurality of carriers; identify, based at least in part on detecting the PHR trigger, a set of carriers, of the plurality of carriers, that is to be ignored when calculating a power headroom associated with a carrier of the plurality of carriers; and calculate the power headroom based at least in part on an uplink transmission, associated with the carrier, and based at least in part on ignoring the set of carriers that is to be ignored.

In some aspects, a non-transitory computer-readable medium may store one or more instructions for wireless communication. The one or more instructions, when executed by one or more processors of a user equipment, may cause the one or more processors to detect a PHR trigger, wherein the user equipment is configured to transmit uplink communications using a plurality of carriers; identify, based at least in part on detecting the PHR trigger, a set of carriers, of the plurality of carriers, that is to be ignored when calculating a power headroom associated with a carrier of the plurality of carriers; and calculate the power headroom based at least in part on an uplink transmission, associated with the carrier, and based at least in part on ignoring the set of carriers that is to be ignored.

In some aspects, an apparatus for wireless communication may include means for detecting a PHR trigger, wherein the apparatus is configured to transmit uplink communications using a plurality of carriers; means for identifying, based at least in part on detecting the PHR trigger, a set of carriers, of the plurality of carriers, that is to be ignored when calculating a power headroom associated with a carrier of the plurality of carriers; and means for calculating the power headroom based at least in part on an uplink transmission, associated with the carrier, and based at least in part on ignoring the set of carriers that is to be ignored.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a user equipment, in accordance with various aspects of the present disclosure.

FIG. 6 is a diagram illustrating an example process performed, for example, by a user equipment, in accordance with various aspects of the present disclosure.

DETAILED DESCRIPTION

Figure 1:
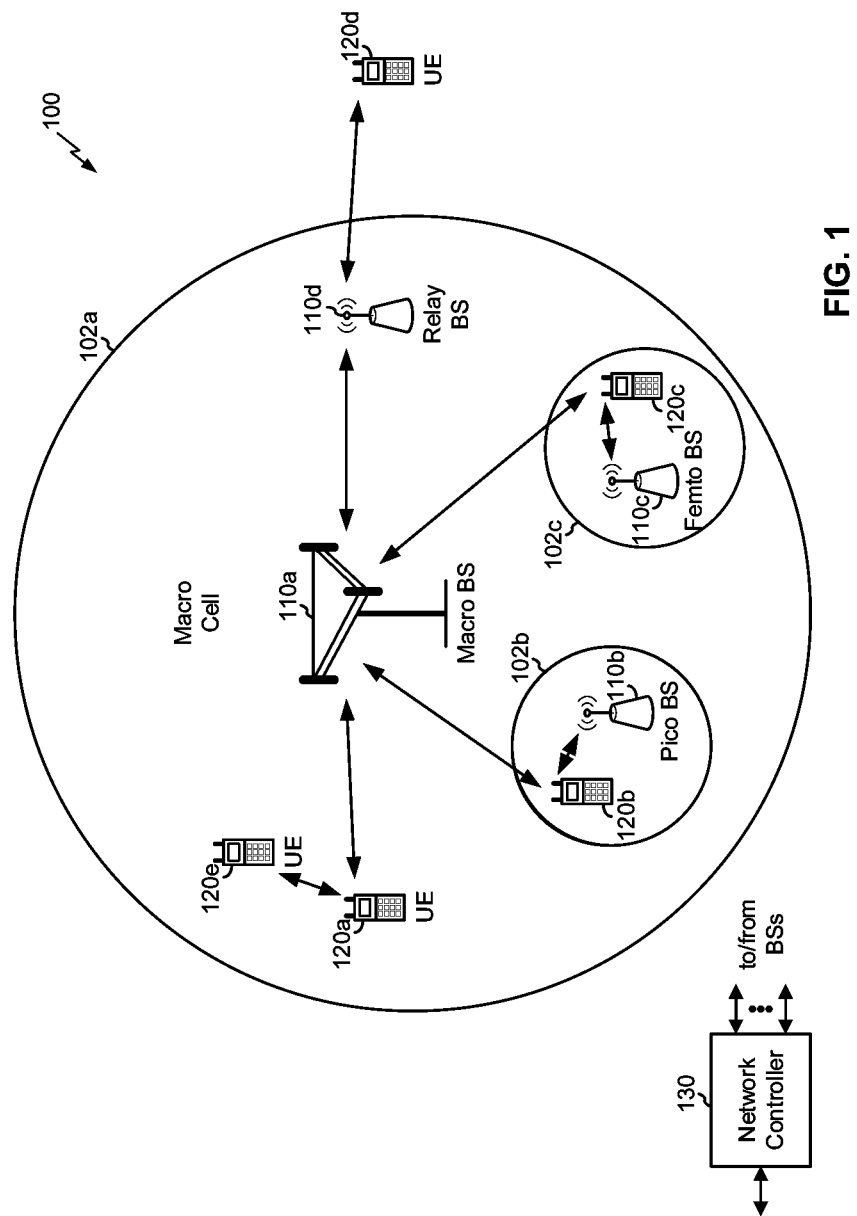
FIG. 1 is a block diagram conceptually illustrating an example of a wireless communication network, in accordance with various aspects of the present disclosure.

In some wireless networks, such as a NR network, an amount of time (i.e., a scheduling delay) between a grant, and an uplink communication associated with the grant, is flexible (i.e., can vary dynamically with each grant/uplink communication). This differs from other types of networks, such as a Long-Term Evolution (LTE) network, where such scheduling delays are not flexible (i.e., are fixed or are functions of only semi-static configurations rather than of any dynamic information in grants).

As an example, in a NR network, a scheduling delay between a first grant (received in a physical downlink control channel (PDCCH)) and a first physical uplink shared channel (PUSCH) communication scheduled by the first grant, may differ from a scheduling delay between a second grant and a second PUSCH communication scheduled by the second grant. This PDCCH-to-PUSCH scheduling delay may be identified by a k2 parameter identified in a given grant.

As another example, a scheduling delay between a first grant, associated with a first physical downlink shared channel (PDSCH) communication, and an acknowledgment or negative acknowledgment feedback (ACK/NACK) associated with the first PDSCH communication, may differ from a scheduling delay between a second grant, associated with a second PDSCH communication, and an ACK/NACK associated with the second PDSCH communication. In this example, the variation may result from flexibility in a scheduling delay between grants and PDSCH communications and/or from flexibility in a scheduling delay between PDSCH communications and ACKs/NACKs. The PDCCH-to-PDSCH scheduling delay may be identified by a k0 parameter, while the PDSCH-to-ACK/NACK scheduling delay may be identified by a k1 parameter, either or both of which may be identified in a given grant. A UE capability may support a minimum value for these parameters, so that the UE has enough time to process the grant and the PDSCH (in case of downlink grants) which may be identified by n0, n1, and n2 parameters respectively. Further, these parameters may have units of slots or of OFDM symbols. For example, k0, k1, and k2 may be in units of slots, while n0, n1, and n2 may be in units of symbols.

A transmit power control (TPC) command may also be included in a grant. The TPC command may indicate an amount by which to increment a transmit power in association with transmitting an uplink communication (e.g., a PUSCH communication scheduled by an uplink grant, an ACK/NACK associated with a PDSCH communication scheduled by a downlink grant, and/or the like). In other words, the TPC command may be used to implement closed-loop power control. In some cases, multiple TPC processes can be configured. For example, the UE may be configured with separate TPC processes for physical uplink control channel (PUCCH) power control and PUSCH power control. Further, each TPC process may use one or more power control loops. In such cases, each TPC command may be associated with a particular TPC process and a particular power control loop associated with the TPC process.

However, due to the flexible nature of scheduling delay, a manner in which a UE processes a given TPC command may be ambiguous. For example, the UE receives a first uplink grant at time to that schedules a first uplink communication (e.g., a PUSCH communication) at time $t_3$, and receives a second uplink grant at time $t_1$ (e.g., a time after time to and before time $t_3$) that schedules a second uplink communication at time $t_2$ (e.g., a time before time $t_3$). In this example, the UE may not be configured with information that indicates how the UE should process a first TPC command and a second TPC command, included in the first uplink grant and the second uplink grant, respectively (e.g., whether/how the first TPC command should be applied to the transmission of the second uplink communication, whether/how the second TPC command should be applied to the transmission of the first uplink communication, and/or the like).

Some aspects described herein provide techniques and apparatuses for power control with flexible scheduling delay. In some aspects, a UE may receive a TPC command in a grant associated with transmitting an uplink communication, wherein a scheduling delay between the grant and the uplink communication is a flexible scheduling delay. Here, the UE may sample a TPC state in association with determining a transmit power for transmitting the uplink communication, and may determine the transmit power based at least in part on the TPC state and the TPC command. In some aspects, the UE may accumulate the TPC command into the TPC (e.g., before sampling the TPC state or after sampling the TPC state). Additional details regarding a manner in which the UE samples the TPC state and (optionally) accumulates the TPC command into the TPC state are described below.

The use of flexible scheduling delay also presents issues regarding calculation of power headrooms by the UE in carrier aggregation (CA) scenarios (e.g., when the UE is configured to transmit uplink communications using multiple carriers). Due to flexible scheduling, concurrent or overlapping transmissions of uplink communications (on different carriers) may be transmitted after scheduling delays of different length (e.g., since the associated grants may be received at different times). Generally, the UE is configured to report a power headroom for every active (e.g., scheduled) carrier upon detecting a power headroom report (PHR) trigger. For a carrier on which a grant was received before an earliest grant received after the PHR trigger was detected, the UE may be configured to report an actual power headroom. Conversely, for a carrier on which a grant was received after the first grant received after the PHR trigger was detected, the UE may be configured to report a reference power headroom (e.g., an estimated power headroom, sometimes referred to as virtual power headroom, for which a maximum power reduction (MPR) and/or an additional MPR (A-MPR) are set to 0 during calculation).

Here, for carriers on which grants come before the earliest grant after the PHR trigger, uplink communications scheduled by later arriving grants are unknown. However, the power headrooms associated with these carriers need to be calculated for inclusion in a PHR transmitted in the uplink. Due to time constraints, the UE cannot wait until all other grants are received before beginning the power headroom calculation (e.g., the UE must begin calculation of the power headrooms for inclusion in an uplink communication scheduled by the earliest grant after the PHR trigger). Thus, one or more parameters associated with calculating power headroom for a given carrier that depend on actual transmissions of uplink communications on all carriers (e.g., a MPR, a A-MPR, a power management MPR (P-MPR), and/or the like) would need to be calculated without knowledge of uplink transmission associated with later arriving grants.

Further, in the case of mixed numerology across carriers, an uplink communication transmitted on a carrier with a comparatively lower subcarrier spacing (SCS) may overlap with two or more uplink communications transmitted on a carrier with a comparatively higher SCS. Here, the UE may not have knowledge regarding a manner in which to select a particular uplink communication on the carrier with the higher SCS that is to be considered in a power headroom calculation for the uplink communication on the carrier with the lower SCS. Further, the UE may not have knowledge regarding a manner in which the UE should select a particular uplink communication on the carrier with the higher SCS that is to be reported in a PHR.

Some aspects described herein provide techniques and apparatuses for power headroom calculation in a CA scenario with flexible scheduling. In some aspects, the UE may detect a PHR trigger associated with a carrier of a plurality of carriers, identify a set of carriers, of a plurality of carriers, that is to be ignored when calculating a power headroom associated with the carrier, and calculate the power headroom based at least in part on an uplink transmission, associated with the carrier, and based at least in part on ignoring the set of carriers that is to be ignored. Additional details regarding a manner in which the UE calculates power headroom in a CA scenario with flexible scheduling are described below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity. In some aspects, a scheduling delay associated with an uplink communication (e.g., a communication to be transmitted by UE 120 to BS 110) may be a flexible scheduling delay, and UE 120 may be perform transmit power control and/or power headroom calculation as described elsewhere herein.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
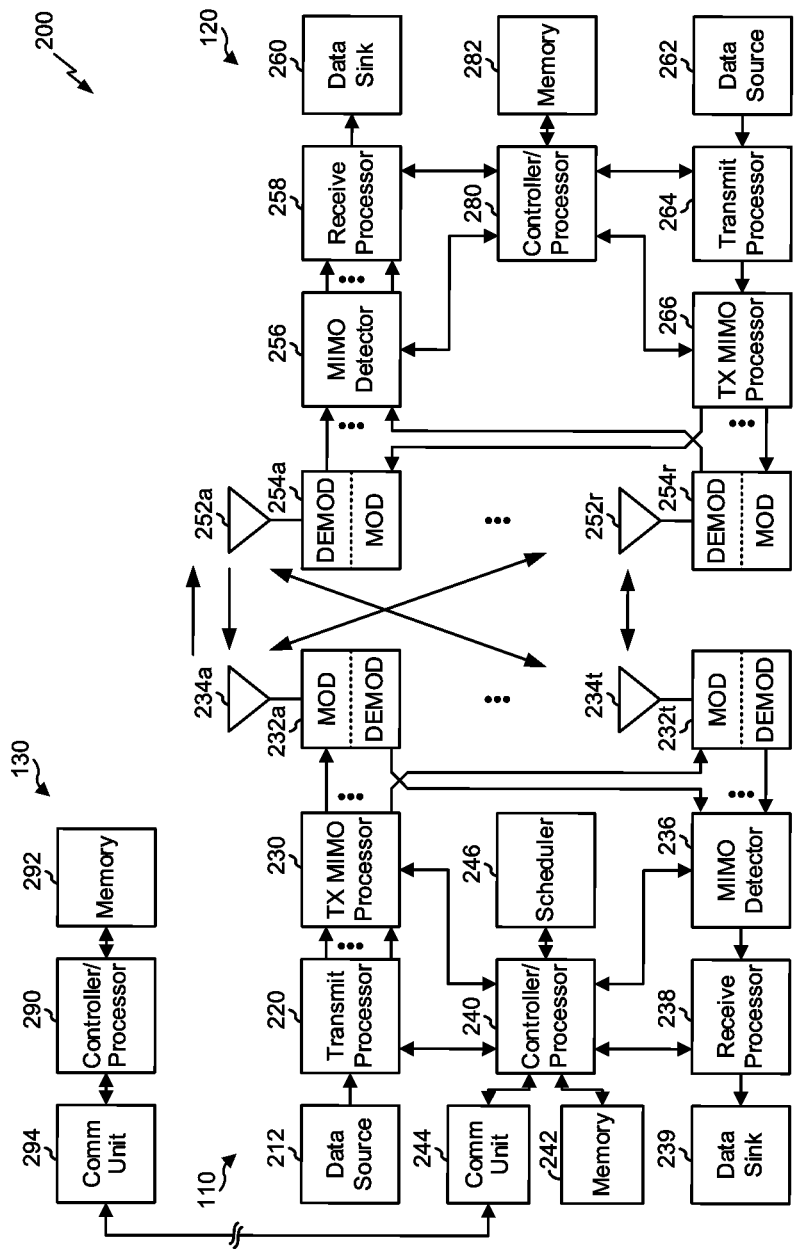
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with power control with flexible scheduling delay and/or power headroom determination with flexible scheduling delay, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a TPC command in a grant associated with transmitting an uplink communication, wherein a scheduling delay between the grant and the uplink communication is a flexible scheduling delay; means for sampling a TPC state in association with determining a transmit power for transmitting the uplink communication; means for determining the transmit power based at least in part on the TPC state and the TPC command; and/or the like. In some aspects, such means may include one or more components of UE 120 described in connection with FIG. 2.

In some aspects, UE 120 may include means for detecting a PHR trigger, wherein UE 120 is configured to transmit uplink communications using a plurality of carriers; means for identifying, based at least in part on detecting the PHR trigger, a set of carriers, of the plurality of carriers, that is to be ignored when calculating a power headroom associated with a carrier of the plurality of carriers; means for calculating the power headroom based at least in part on an uplink transmission, associated with the carrier, and based at least in part on ignoring the set of carriers that is to be ignored; and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3A:
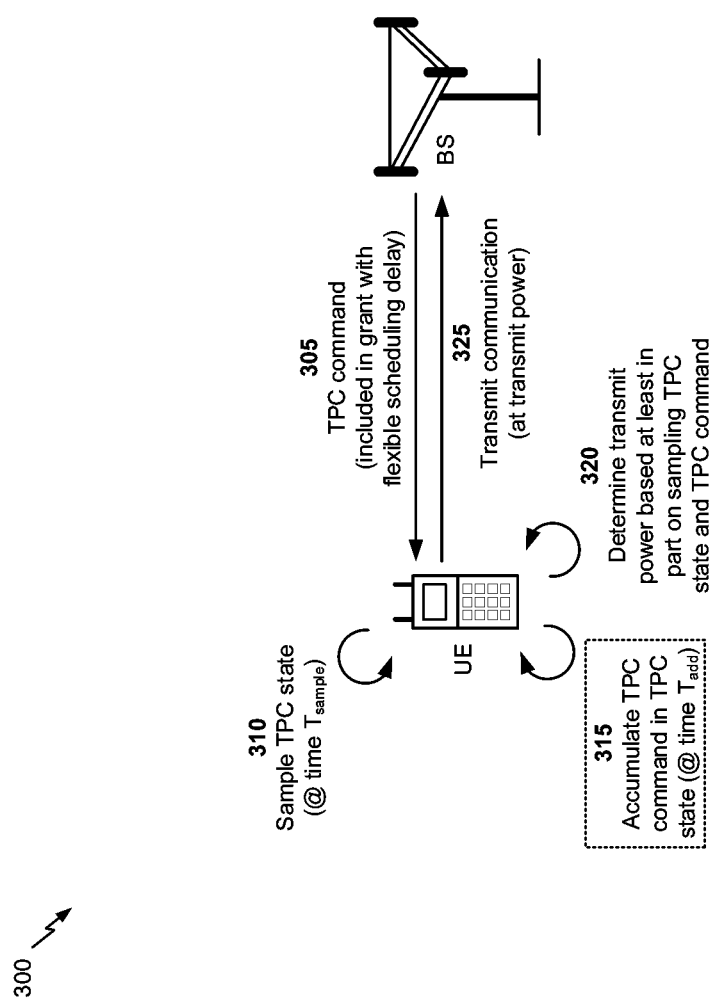
FIGS. 3A and 3B are diagrams illustrating examples associated with transmit power control with flexible scheduling delay, in accordance with various aspects of the present disclosure.
Figure 3B:
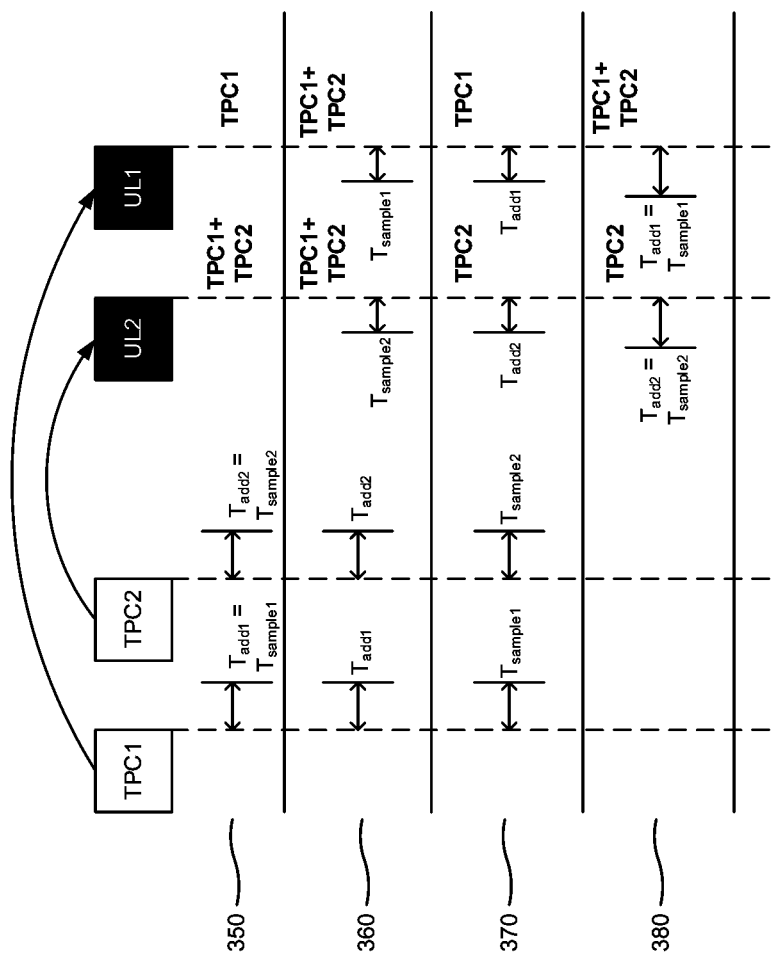

FIGS. 3A and 3B are diagrams illustrating examples of transmit power control with flexible scheduling delay, in accordance with various aspects of the present disclosure.

As shown in FIG. 3A, and by reference number 305, a UE (e.g., UE 120) may receive a TPC command included in a grant associated with an uplink communication. In some aspects, the uplink communication associated with the grant may be a PUSCH communication, a physical uplink control channel (PUCCH) communication, an ACK/NACK, a sounding reference signal (SRS), a physical random access channel (PRACH) sequence, or another type of uplink communication. In some aspects, the grant may include information that identifies a scheduling delay, as described above.

For example, the UE may receive an uplink grant associated with scheduling a PUSCH communication, where the grant includes information that identifies a k2 parameter that identifies a scheduling delay between the uplink grant and the PUSCH communication. As another example, the UE may receive a downlink grant associated with scheduling a PUCCH communication (e.g., an ACK/NACK) for a PDSCH communication scheduled by the downlink grant. Here, the grant may include information that identifies a k0 parameter that identifies a scheduling delay between the downlink grant and the PDSCH communication and/or a k1 parameter that identifies a scheduling delay between the PDSCH communication and the PUCCH communication.

As shown by reference number 310, the UE may sample a TPC state in association with determining a transmit power for transmitting the uplink communication. The TPC state is a state variable that represents a transmit power level. In some aspects, the UE may determine a transmit power for transmitting the uplink communication based at least in part on a result of sampling the TPC state, as described below. In some aspects, the UE may store the TPC state (e.g., in a register configured on the UE). In some aspects, the UE may modify the TPC state based at least in part on the TPC command, as described in further detail below.

As further indicated by reference number 310, the UE may sample the TPC state at time $T_{sample}$. In some aspects, time $T_{sample}$ (i.e., the time at which the UE samples the TPC state) may be relative to the grant (e.g., the UE may determine time $T_{sample}$ relative to a time at which the UE received the grant). In some aspects, time $T_{sample}$ may be relative to a resource associated with transmitting the uplink communication (e.g., the UE may determine time $T_{sample}$ relative to a time at which the uplink communication is scheduled).

In some aspects, an amount of time between the grant and $T_{sample}$ or an amount of time between $T_{sample}$ and the resource (depending on which $T_{sample}$ is determined relative to) may be based at least in part on the scheduling delay between the grant and the uplink communication (e.g., such that a first scheduling delay causes the UE to sample the TPC state at a comparatively different time than a time at which a second scheduling delay causes the UE to sample the TPC state). Additionally, or alternatively, the amount of time may be based at least in part on a grant type of the grant (e.g., such that a downlink grant causes the UE to sample the TPC state at a comparatively different time than a time at which an uplink grant causes the UE to sample the TPC state). Additionally, or alternatively, the amount of time may be based at least in part on a capability of the UE, for example, on one or more of the capability parameters n0, n1, and n2.

In some aspects, the amount of time may be semistatically configured or may be dynamically determined by the UE. In some aspects, information that identifies the amount of time may be signaled to the UE in downlink control information (DCI), may be a preconfigured constant, or may be a function of one or more DCI parameters. In some aspects, the amount of time may be on a symbol-level granularity, a slot-level granularity, and/or the like.

As further shown in FIG. 3A, and by reference number 315, the UE may accumulate the TPC command into the TPC state. In some aspects, the UE may accumulate the TPC command into the TPC state by modifying (e.g., adding, subtracting, or leaving unchanged) an amount of transmit power, identified by the TPC state, by an amount of transmit power identified by the TPC command. In some aspects, the UE may update the TPC state stored by the UE based at least in part on accumulating the TPC command into the TPC state. In some aspects, accumulating the TPC command into the TPC state is optional (e.g., the UE may be configured not to accumulate the TPC command into the TPC state).

As further indicated by reference number 315, the UE may accumulate the TPC command into the TPC state at time $T_{add}$. In some aspects, time $T_{add}$ (i.e., the time at which the UE accumulates the TPC command into the TPC state) may be relative to the grant (e.g., the UE may determine time $T_{add}$ relative to a time at which the UE received the grant). In some aspects, time $T_{add}$ may be relative to a resource associated with transmitting the uplink communication (e.g., the UE may determine time $T_{add}$ relative to a time at which the uplink communication is scheduled).

In some aspects, an amount of time between the grant and $T_{add}$ or an amount of time between $T_{add}$ and the resource (depending on which $T_{add}$ is determined relative to) may be based at least in part on the scheduling delay between the grant and the uplink communication (e.g., such that a first scheduling delay causes the UE to add the TPC command to the TPC state at a comparatively different time than a time at which a second scheduling delay causes the UE to add the TPC command to the TPC state). Additionally, or alternatively, the amount of time may be based at least in part on a grant type of the grant (e.g., such that a downlink grant causes the UE to add the TPC command to the TPC state at a comparatively different time than a time at which an uplink grant causes the UE to add the TPC command to the TPC state). Additionally, or alternatively, the amount of time may be based at least in part on a capability of the UE (for example, on one or more of the capability parameters n0, n1, or n2).

In some aspects, the amount of time may be semistatically configured or may be dynamically determined by the UE. In some aspects, information that identifies the amount of time may be signaled to the UE in DCI, may be a preconfigured constant, or may be a function of one or more DCI parameters. In some aspects, the amount of time may be on a symbol-level granularity, a slot-level granularity, and/or the like.

In some aspects, the UE may be configured to accumulate the TPC command into the TPC state before the UE samples the TPC state. In some aspects, the UE may be configured to accumulate the TPC command into the TPC state after the UE samples the TPC state. In some aspects, the UE may be configured to accumulate the TPC command into the TPC state and sample the TPC state at a same time (e.g., such that the TPC command is accumulated into the TPC state concurrently with the TPC state being sampled).

In some aspects, when timing of the TPC state being sampled by the UE coincides with timing of at least one TPC command being accumulated into the TPC state, the UE may be configured to sample the TPC state after the at least one TPC command is accumulated into the TPC state (e.g., such that a result of sampling the TPC state will reflect the accumulation of the TPC command).

In some aspects, when timing of the TPC state being sampled by the UE coincides with timing of at least one TPC command being accumulated into the TPC state, the UE may be configured to sample the TPC state before the at least one TPC command is accumulated into the TPC state (e.g., such that a result of sampling the TPC state will not reflect the accumulation of the TPC command). In such a case, when the at least one TPC command is the TPC command associated with the grant that caused the UE to sample the TPC state, the UE may be configured to add the TPC command to a result of sampling the TPC state.

As further shown by FIG. 3A, and by reference number 320, the UE may determine a transmit power based at least in part on a result of sampling the TPC state. For example, the UE may determine that a transmit power, at which the UE is to transmit the uplink communication, is identified by the result of the TPC state (i.e., the result of sampling the TPC state may identify the transmit power). As another example, the UE may determine that the transmit power, at which the UE is to transmit the uplink communication, is identified by the result of sampling the TPC state plus the TPC command (e.g., the result of sampling the TPC state plus the TPC command may identify the transmit power uplink). This may be the case when, for example, the UE samples the TPC state before accumulating the TPC command into the TPC state, or when the UE does not accumulate the TPC command into the TPC state.

As shown by reference number 325, the UE may transmit the uplink communication at the transmit power determined as described above. In this way, a UE may be configured to manage power control for uplink communications with flexible scheduling delay.

FIG. 3B illustrates various example aspects associated with power control with flexible scheduling delay. For each example aspect, the UE has received a first grant that includes a first TPC command (TPC1) and schedules a first uplink communication (UL1), and has received a second grant that includes a second TPC command (TPC2) and schedules a second uplink communication (UL2). The uplink communications may be PUSCH transmissions (e.g., when the grants are uplink grants) or PUCCH transmissions carrying ACK/NACK (e.g., when the grants are downlink grants).

With reference to example 350 in FIG. 3B, the UE may be configured to determine both $T_{sample}$ and $T_{add}$ relative to the respective grants (rather than the resources associated with the respective uplink communications). As further shown, the UE may be configured such that an amount of time between the grant and $T_{sample}$ matches an amount of time between the grant and $T_{add}$. As shown, in association with the first grant, the UE accumulates TPC1 into the TPC state and samples the TPC state at time $T_{add1}$ (which matches time $T_{sample1}$). As further shown, in association with the second grant, the UE accumulates TPC2 into the TPC state and samples the TPC state at time $T_{add2}$ (which matches time $T_{sample2}$). As a result, as shown, a transmit power for UL2 is based at least in part on TPC1 and TPC2 (e.g., since TPC1 and TPC2 were accumulated into the TPC state before or concurrently with the sampling of the TPC state at $T_{sample2}$). Here, as further shown, a transmit power for UL1 will be based at least in part on TPC1 but will not be based on TPC2 (e.g., since TPC2 was not accumulated into the TPC state until after the UE sampled the TPC state at $T_{sample1}$).

With reference to example 360 in FIG. 3B, the UE may be configured to determine $T_{add}$ relative to the respective grants and may be configured to determine $T_{sample}$ relative to the respective resources for the uplink communications. As shown, in association with the first grant, the UE accumulates TPC1 into the TPC state at Tato, and, in association with the second grant, accumulates TPC2 into the TPC state at time $T_{add2}$. Next, in association with determining a transmit power for UL2, the UE samples the TPC state at $T_{sample2}$. As a result, as shown, a transmit power for UL2 will be based at least in part on TPC1 and TPC2 (e.g., since TPC1 and TPC2 were accumulated into the TPC state before the sampling of the TPC state at $T_{sample2}$). Similarly, in association with determining a transmit power for UL1, the UE samples the TPC state at $T_{sample1}$. As a result, as shown, a transmit power for UL1 will be based at least in part on TPC1 and TPC2 (e.g., since TPC1 and TPC2 were accumulated into the TPC state before the sampling of the TPC state at $T_{sample1}$).

With reference to example 370 in FIG. 3B, the UE may be configured to determine $T_{sample}$ relative to the respective grants and may be configured to determine $T_{add}$ relative to the respective resources for the uplink communications. As shown, in association with the first grant, the UE samples the TPC state at $T_{sample2}$. As further shown, in association with the second grant, the UE samples the TPC state at $T_{sample2}$. Next, the UE accumulates TPC2 into the TPC state at $T_{add2}$. Then, the UE determines a transmit power for UL2 by adding TPC2 to a result of sampling the TPC state at time $T_{sample2}$. Here, the UE may be configured to add TPC2 to the result of sampling the TPC state at $T_{sample2}$ since TPC2 was not accumulated into the TPC state prior to or concurrently with sampling of the TPC state in association with determining a transmit power for UL2. Thus, as shown, the transmit power for UL2 will be based at least in part on TPC2, but not TPC1 (e.g., since TPC1 was not accumulated into the TPC state until after $T_{sample2}$).

Similarly, the UE accumulates TPC1 into the TPC state at Tato. Then, the UE determines a transmit power for UL1 by adding TPC1 to a result of sampling the TPC state at time $T_{sample1}$. Here, the UE may be configured to add TPC1 to the result of sampling the TPC state at $T_{sample1}$ since TPC1 was not accumulated into the TPC state prior to or concurrently with sampling of the TPC state in association with determining a transmit power for UL1. Thus, as shown, the transmit power for UL1 will be based at least in part on TPC1, but not TPC2 (e.g., since TPC2 was not accumulated into the TPC state until after $T_{sample1}$).

With reference to example 380 in FIG. 3B, the UE may be configured to determine both $T_{sample}$ and $T_{add}$ relative to the respective resources associated with the respective uplink communications (rather than the respective grants). As further shown, the UE may be configured such that an amount of time between the grant and $T_{sample}$ matches an amount of time between the grant and $T_{add}$. As shown, in association with the second grant, the UE accumulates TPC2 into the TPC state and samples the TPC state at time $T_{add2}$ (which matches time $T_{sample2}$). As a result, as shown, a transmit power for UL2 is based at least in part on TPC2 but not TPC1 (e.g., since TPC1 will not be accumulated into the TPC state until after the sampling of the TPC state at $T_{sample2}$). As further shown, in association with the first grant, the UE accumulates TPC1 into the TPC state and samples the TPC state at time $T_{add}$ (which matches time $T_{sample1}$). As shown, a transmit power for UL1 will be based at least in part on TPC1 and TPC2 (e.g., since both TPC1 and TPC2 were accumulated into the TPC state before or concurrently with the UE sampling the TPC state at $T_{sample1}$).

As indicated above, FIGS. 3A and 3B are provided as examples. Other examples may differ from what is described with respect to FIGS. 3A and 3B. Notably, while the above described techniques are described in the context of transmit power control, these techniques may be applied in association with another state variable (e.g., other than the TPC state) that is needed to determine a parameter for a granted uplink communication. For example, a beam indication, included in a grant, may refer to a reference signal, but a state and/or a beam associated with the reference signal may itself be updated in an interval between the grant and a granted resource, in a manner similar to that described above. In such a case, different definitions of beam-state can be used by defining $T_{sample}$ appropriately.

FIG. 4 is a diagram illustrating an example process 400 performed, for example, by a UE, in accordance with various aspects of the present disclosure. Example process 400 is an example where a UE (e.g., UE 120) performs transmit power control with flexible scheduling delay.

As shown in FIG. 4, in some aspects, process 400 may include receiving a transmit power control (TPC) command in a grant associated with transmitting an uplink communication, wherein a scheduling delay between the grant and the uplink communication is a flexible scheduling delay (block 410). For example, the UE (e.g., using antenna 252, receive processor 258, controller/processor 280, and/or the like) may receive a TPC command in a grant associated with transmitting an uplink communication, wherein a scheduling delay between the grant and the uplink communication is a flexible scheduling delay, as described above.

As shown in FIG. 4, in some aspects, process 400 may include sampling a TPC state in association with determining a transmit power for transmitting the uplink communication (block 420). For example, the UE (e.g., using controller/processor 280, transmit processor 264, and/or the like) may sample a TPC state in association with determining a transmit power for transmitting the uplink communication, as described above.

As shown in FIG. 4, in some aspects, process 400 may include determining the transmit power based at least in part on the TPC state and the TPC command (block 430). For example, the UE (e.g., using controller/processor 280, transmit processor 264, and/or the like) may determine the transmit power based at least in part on the TPC state and the TPC command, as described above.

Process 400 may include additional aspects, such as any single aspect or any combination of aspects described below and/or in connection with one or more other processes described elsewhere herein.

In a first aspect, timing associated with sampling the TPC state is relative to the grant.

In a second aspect, alone or in combination with the first aspect, timing associated with sampling the TPC state is relative to a resource associated with transmitting the uplink communication.

In a third aspect, alone or in combination with any one or more of the first and second aspects, when timing of the TPC state being sampled coincides with timing of at least one TPC command that is to be accumulated into the TPC state, the TPC state is sampled after the at least one TPC command is accumulated into the TPC state.

In a fourth aspect, alone or in combination with any one or more of the first through third aspects, when timing of the TPC state being sampled coincides with timing of at least one TPC command that is to be accumulated into the TPC state, the TPC state is sampled before the at least one TPC command is accumulated into the TPC state.

In a fifth aspect, in combination with the fourth aspect, when the at least one TPC command is the TPC command, the TPC command is added to a result of sampling the TPC state.

In a sixth aspect, alone or in combination with any one or more of the first through fifth aspects, timing of the TPC state being sampled is based at least in part on at least one of the scheduling delay between the grant and the uplink communication, a grant type associated with the grant, or a capability of the UE.

In a seventh aspect, alone or in combination with any one or more of the first through sixth aspects, timing of the TPC state being sampled is semistatically configured.

In an eighth sixth aspect, alone or in combination with any one or more of the first through seventh aspects, timing of the TPC state being sampled is dynamically determined.

In a ninth aspect, alone or in combination with any one or more of the first through eighth aspects, information associated with timing of the TPC state being sampled is at least one of: signaled in downlink control information (DCI), a preconfigured constant, or a function of a DCI parameter.

In a tenth aspect, alone or in combination with any one or more of the first through ninth aspects, the uplink communication is one of: a physical uplink shared channel (PUSCH) communication, a physical uplink control channel (PUCCH) communication, a sounding reference signal (SRS), or a physical random access channel (PRACH) sequence.

In an eleventh aspect, alone or in combination with any one or more of the first through tenth aspects, the TPC command is accumulated the TPC state.

In a twelfth aspect, in combination with the eleventh aspect, timing associated with accumulating the TPC command into the TPC state is relative to the grant.

In a thirteenth aspect, in combination with any one or more of the eleventh and twelfth aspects, timing associated with accumulating the TPC command into the TPC state is relative to a resource associated with transmitting the uplink communication.

In a fourteenth aspect, in combination with any one or more of the eleventh through thirteenth aspects, the TPC command is accumulated into the TPC state before the TPC state is sampled.

In a fifteenth aspect, in combination with any one or more of the eleventh through fourteenth aspects, the TPC state is sampled before the TPC command is accumulated.

In a sixteenth thirteenth aspect, in combination with any one or more of the eleventh through fifteenth aspects, the TPC command is accumulated into the TPC state concurrently with the TPC state being sampled.

In a seventeenth aspect, in combination with any one or more of the eleventh through sixteenth aspects, timing of the TPC command being accumulated into the TPC state is based at least in part on at least one of: the scheduling delay between the grant and the uplink communication, a grant type associated with the grant, or a capability of the UE.

In an eighteenth aspect, in combination with any one or more of the eleventh through seventeenth aspects, timing of the TPC command being accumulated into the TPC state is semistatically configured.

In a nineteenth aspect, in combination with any one or more of the eleventh through eighteenth aspects, timing of the TPC command being accumulated into the TPC state is dynamically determined.

In a twentieth aspect, in combination with any one or more of the eleventh through nineteenth aspects, information associated with timing of the TPC command being accumulated into the TPC state is at least one of: signaled in downlink control information (DCI), a preconfigured constant, or a function of a DCI parameter.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Although the discussions above have been with respect to determining the transmit power for an uplink transmission, the same concepts also apply when determining UL power headroom reports. These reports are computed based on a maximum available transmit power per carrier (Pc,max) and the actual transmit power, or a virtual transmit power. A virtual transmit power is a power computed when no actual UL transmission occurs, using default assumptions for various parameters such as A-MPR, MCS, etc. which are normally associated with a UL transmission in the case that such a transmission actually occurs. The computation of the actual or virtual transmit power may be based on a TPC command and/or a TPC state, just as described above. For a given TPC process and closed-loop index, the TPC state used for this purpose may be the same as that used for determining the transmit power. Thus the $T_{add}$ value may be the same in both cases. However, the $T_{sample}$ time for transmit power computation may or may not be same as that for power headroom report. Further, it may be same or different for actual versus for virtual power headroom reports.

Figure 5:
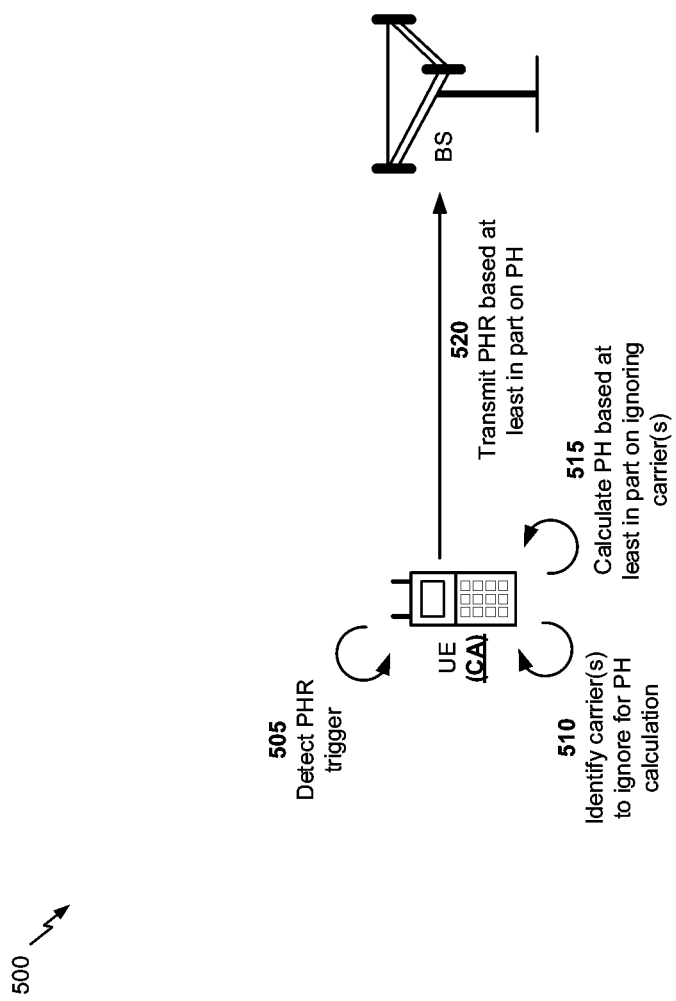
FIG. 5 is a diagram illustrating an example of power headroom calculation with flexible scheduling delay, in accordance with various aspects of the present disclosure.

FIG. 5 is a diagram illustrating an example 500 of power headroom calculation in a CA scenario with flexible scheduling, in accordance with various aspects of the present disclosure. For the purposes of FIG. 5, a UE (e.g., UE 120) is configured for carrier aggregation such that the UE can be scheduled for, and can transmit, uplink communications on multiple component carriers (herein referred to as carriers).

As shown in FIG. 5, and by reference number 505, the UE may detect a PHR trigger. The PHR trigger includes an event, detected by the UE, that causes the UE to calculate power headroom and provide, to a base station (e.g., BS 110), a PHR. In some aspects, in a CA scenario, the UE may be configured to provide a PHR that includes power headroom for all active carriers (e.g., carriers on which transmission of an uplink communication is scheduled). For example, the UE may provide a PHR that includes actual power headrooms for some carriers, and reference or virtual power headrooms for other carriers. In some aspects, the UE may detect the PHR trigger based at least in part on determining that an amount of path loss has changed by an amount that satisfies a threshold, based at least in part on expiration of a timer, and/or in another manner. In some aspects, the UE may be configured to transmit the PHR in an uplink communication associated with one of the multiple carriers. In such a case, the PHR, included in the uplink communication, may carry power headrooms associated with one or more of the multiple carriers.

As shown by reference number 510, based at least in part on detecting the PHR trigger, the UE may identify a set of carriers, of the multiple carriers, that the UE should ignore when calculating a power headroom. In some aspects, the UE may ignore one or more carriers, of the multiple carriers, in order to remove complexities introduced due to flexible scheduling, as described below.

In some aspects, the UE may identify the set of carriers based at least in part on determining that a set of uplink grants, each associated with one of the set of carriers, was received by the UE after a particular time. For example, before detecting the PHR trigger, assume that the UE has received, on a first carrier, a grant associated with scheduling an uplink communication on the first carrier. Next, the UE detects the PHR trigger, after which the UE receives, on a second carrier, a grant associated with scheduling an uplink communication on the second carrier. Notably, the grant on the second carrier is the earliest grant after the PHR trigger. Additionally, after receiving the grant on the second carrier, the UE receives, on a third carrier, a grant associated with scheduling an uplink communication on the third carrier.

In this example, the UE may be configured to ignore carriers for which uplink grants were received by the UE after a particular time, such as a time at which the earliest grant after the PHR trigger was received. Thus, in this case, the UE may identify the set of carriers to be ignored as including the third carrier (e.g., since the grant was received on the third carrier after the grant was received on the second carrier, which was the earliest grant after the PHR trigger). As a result, in this example, the UE would calculate the power headroom for the first carrier while taking into account transmit power associated with the second carrier, but without taking into account transmit power on the third carrier. Similarly, the UE would calculate the power headroom for the second carrier while taking into account transmit power associated with the first carrier, but without taking into account transmit power on the third carrier.

Further, continuing with the above example, the UE may identify the set of carriers as including a fourth carrier on which no grant was received. In other words, the UE may be configured to identify the set of carriers to be ignored based at least in part on determining that the UE has no uplink grants associated with the set of carriers, in some aspects.

In some aspects, the UE may identify the set of carriers to be ignored as including all carriers, of the multiple carriers, other than the carrier for which the UE is to calculate the power headroom. In this case, with reference to the above described scenario, the UE would calculate the power headroom for the first carrier without taking into account transmit power on the second carrier or the third carrier. Similarly, the UE would calculate the power headroom for the second carrier without taking into account transmit power on the first carrier or the third carrier.

In some aspects, the UE may identify the set of carriers to be ignored based at least in part on determining that a set of uplink grants, each associated with one of the set of carriers, was received by the UE after a threshold amount of time from a time at which an uplink grant, associated with the carrier, was received by the UE. For example, for a carrier with a grant received in slot i, the UE may be configured to ignore all other carriers whose grant comes at slot i+1 or later (e.g., where slot i is the slot based on the SCS of the carrier).

As further shown in FIG. 5, and by reference number 515, the UE may calculate the power headroom based at least in part on ignoring the set of carriers. For example, the UE may calculate the power headroom for each active carrier, ignoring those carriers identified in the manner described above.

In some aspects, the UE may calculate the power headroom, associated with a given carrier, based at least in part on a particular uplink transmission of at least two uplink transmissions associated with another carrier. For example, an uplink transmission on a first carrier may at least partially overlap at least two uplink transmissions on a second carrier (e.g., when the second carrier has a higher SCS than the first carrier). In this case, the UE may calculate the power headroom, associated with the first carrier, based at least in part on one of the at least two uplink transmissions associated with the other carrier. In some aspects, the UE may be configured to calculate the power headroom based at least in part on an earliest uplink communication of the at least two uplink communications. In some aspects, the UE may be configured to calculate the power headroom based at least in part on a last uplink communication of the at least two uplink communications. In some aspects, the UE may be configured to calculate the power headroom based at least in part on an uplink transmission, of the at least two uplink transmissions, with a smallest or a largest power headroom, transmit power, assignment size, priority level (e.g., prioritize URLLC above eMBB), and/or the like.

In some aspects, the UE may calculate the power headroom, associated with a given carrier, based at least in part on a particular uplink transmission of at least two uplink transmissions associated with the given carrier. Continuing with the above example, the UE may calculate the power headroom, associated with the second carrier, based at least in part on the earliest uplink communication associated with the second carrier, the last uplink communication associated with the second carrier, or the uplink transmission, of the at least two uplink transmissions, with the smallest power headroom.

As further shown in FIG. 5, by reference number 520, the UE may transmit the PHR (e.g., to the BS) based at least in part on calculating the power headrooms associated with the active carriers. In this way, a UE in a CA scenario may be configured to manage power headroom calculation for uplink communications with flexible scheduling delay.

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where a UE (e.g., UE 120) performs power headroom calculation with flexible scheduling delay.

As shown in FIG. 6, in some aspects, process 600 may include detecting a power headroom report (PHR) trigger, wherein the UE is configured to transmit uplink communications using a plurality of carriers (block 610). For example, the UE (e.g., using receive processor 258, controller/processor 280, transmit processor 266, and/or the like) may detect a PHR trigger, wherein the UE is configured to transmit uplink communications using a plurality of carriers, as described above.

As shown in FIG. 6, in some aspects, process 600 may include identifying, based at least in part on detecting the PHR trigger, a set of carriers, of the plurality of carriers, that is to be ignored when calculating a power headroom associated with a carrier of the plurality of carriers (block 620). For example, the UE (e.g., using controller/processor 280, transmit processor 266, and/or the like) may identify based at least in part on detecting the PHR trigger, a set of carriers, of the plurality of carriers, that is to be ignored when calculating a power headroom associated with a carrier, of the plurality of carriers, as described above.

As shown in FIG. 6, in some aspects, process 600 may include calculating the power headroom based at least in part on an uplink transmission, associated with the carrier, and based at least in part on ignoring the set of carriers that is to be ignored (block 630). For example, the UE (e.g., using controller/processor 280, transmit processor 266, and/or the like) may calculate the power headroom based at least in part on an uplink transmission, associated with the carrier, and based at least in part on ignoring the set of carriers that is to be ignored, as described above.

Process 600 may include additional aspects, such as any single aspect or any combination of aspects described below and/or in connection with one or more other processes described elsewhere herein.

In a first aspect, the set of carriers is identified based at least in part on determining that a set of uplink grants was received by the UE after a particular time, wherein each uplink grant, of the set of uplink grants, is associated with a respective carrier of the set of carriers.

In a second aspect in combination with the first aspect, the particular time is a time at which a first grant was received after the PHR trigger was detected.

In a third aspect, alone or in combination with any one or more of the first and second aspects, the set of carriers is identified based at least in part on determining that the UE has no uplink grants associated with the set of carriers.

In a fourth aspect, alone or in combination with any one or more of the first through third aspects, the set of carriers includes all carriers, of the plurality of carriers, other than the carrier for which the power headroom is calculated.

In a fifth aspect, alone or in combination with any one or more of the first through fourth aspects, the set of carriers is identified based at least in part on determining that a set of uplink grants was received by the UE after a threshold amount of time from a time at which an uplink grant, associated with the carrier, was received by the UE, wherein each uplink grant, of the set of uplink grants, is associated with a respective carrier of the set of carriers.

In a sixth aspect, alone or in combination with any one or more of the first through fifth aspects, the power headroom is calculated further based at least in part on a particular uplink transmission of at least two uplink transmissions associated with another carrier of the plurality of carriers, wherein the at least two uplink transmissions at least partially overlap the uplink transmission associated with the carrier.

In a seventh aspect, in combination with the sixth aspect, a subcarrier spacing, associated with the other carrier, is higher than a subcarrier spacing of the carrier.

In an eighth aspect, in combination with any one or more of the sixth and seventh aspects, the particular uplink transmission is a first uplink transmission of the at least two uplink transmissions.

In a ninth aspect, in combination with any one or more of the sixth through eighth aspects, the particular uplink transmission is a last uplink transmission of the at least two uplink transmissions.

In a tenth aspect, in combination with any one or more of the sixth through ninth aspects, the particular uplink transmission is an uplink transmission, of the at least two uplink transmissions, with a smallest power headroom.

In an eleventh aspect, alone or in combination with any one or more of the first through tenth aspects, the uplink transmission is a particular one of at least two uplink transmissions associated with the carrier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting a power headroom report (PHR) trigger,
      wherein the UE is configured to transmit uplink communications using a plurality of carriers;
   identifying, based at least in part on detecting the PHR trigger, a set of carriers, of the plurality of carriers, that is to be ignored when calculating a power headroom associated with a carrier of the plurality of carriers; and
   calculating the power headroom based at least in part on an uplink transmission, associated with the carrier, based at least in part on ignoring the set of carriers that is to be ignored, and based at least in part on a particular uplink transmission associated with another carrier of the plurality of carriers,
      wherein a subcarrier spacing, associated with the other carrier, is higher than a subcarrier spacing of the carrier.

2. The method of claim 1, wherein the set of carriers is identified based at least in part on determining that a set of uplink grants was received by the UE after a particular time,
   wherein each uplink grant, of the set of uplink grants, is associated with a respective carrier of the set of carriers.

3. The method of claim 2, wherein the particular time is a time at which a first grant was received after the PHR trigger was detected.

4. The method of claim 1, wherein the set of carriers is identified based at least in part on determining that the UE has no uplink grants associated with the set of carriers.

5. The method of claim 1, wherein the set of carriers is identified based at least in part on determining that a set of uplink grants was received by the UE after a threshold amount of time from a time at which an uplink grant, associated with the carrier, was received by the UE,
   wherein each uplink grant, of the set of uplink grants, is associated with a respective carrier of the set of carriers.

6. The method of claim 1,
wherein the particular uplink transmission is one of at least two uplink transmissions associated with the other carrier,
wherein the at least two uplink transmissions at least partially overlap the uplink transmission associated with the carrier.

7. The method of claim 6, wherein the particular uplink transmission is a first uplink transmission of the at least two uplink transmissions.

8. The method of claim 6, wherein the particular uplink transmission is a last uplink transmission of the at least two uplink transmissions.

9. The method of claim 6, wherein the particular uplink transmission is an uplink transmission, of the at least two uplink transmissions, with a smallest power headroom.

10. The method of claim 6, wherein the uplink transmission is a particular one of at least two uplink transmissions associated with the carrier.

11. A user equipment (UE) for wireless communication, comprising:
a memory; and
one or more processors operatively coupled to the memory, the one or more processors configured to:
detect a power headroom report (PHR) trigger,
wherein the UE is configured to transmit uplink communications using a plurality of carriers;
identify, based at least in part on detecting the PHR trigger, a set of carriers, of the plurality of carriers, that is to be ignored when calculating a power headroom associated with a carrier of the plurality of carriers; and
calculate the power headroom based at least in part on an uplink transmission, associated with the carrier, based at least in part on ignoring the set of carriers that is to be ignored, and based at least in part on a particular uplink transmission associated with another carrier of the plurality of carriers,
wherein a subcarrier spacing, associated with the other carrier, is higher than a subcarrier spacing of the carrier.

12. The UE of claim 11, wherein the set of carriers is identified based at least in part on determining that a set of uplink grants was received by the UE after a particular time,
wherein each uplink grant, of the set of uplink grants, is associated with a respective carrier of the set of carriers.

13. The UE of claim 12, wherein the particular time is a time at which a first grant was received after the PHR trigger was detected.

14. The UE of claim 11, wherein the set of carriers is identified based at least in part on determining that the UE has no uplink grants associated with the set of carriers.

15. The UE of claim 11, wherein the set of carriers is identified based at least in part on determining that a set of uplink grants was received by the UE after a threshold amount of time from a time at which an uplink grant, associated with the carrier, was received by the UE,
wherein each uplink grant, of the set of uplink grants, is associated with a respective carrier of the set of carriers.

16. The UE of claim 11,
wherein the particular uplink transmission is one of at least two uplink transmissions associated with the other carrier,
wherein the at least two uplink transmissions at least partially overlap the uplink transmission associated with the carrier.

17. The UE of claim 16, wherein the particular uplink transmission is a first uplink transmission of the at least two uplink transmissions.

18. The UE of claim 16, wherein the particular uplink transmission is a last uplink transmission of the at least two uplink transmissions.

19. The UE of claim 16, wherein the particular uplink transmission is an uplink transmission, of the at least two uplink transmissions, with a smallest power headroom.

20. The UE of claim 16, wherein the uplink transmission is a particular one of at least two uplink transmissions associated with the carrier.

21. A non-transitory computer-readable medium storing one or more instructions for wireless communication, the one or more instructions comprising:
one or more instructions that, when executed by one or more processors of a user equipment, cause the one or more processors to:
detect a power headroom report (PHR) trigger,
wherein the UE is configured to transmit uplink communications using a plurality of carriers;
identify, based at least in part on detecting the PHR trigger, a set of carriers, of the plurality of carriers, that is to be ignored when calculating a power headroom associated with a carrier of the plurality of carriers; and
calculate the power headroom based at least in part on an uplink transmission, associated with the carrier, based at least in part on ignoring the set of carriers that is to be ignored, and based at least in part on a particular uplink transmission associated with another carrier of the plurality of carriers,
wherein a subcarrier spacing, associated with the other carrier, is higher than a subcarrier spacing of the carrier.

22. The non-transitory computer-readable medium of claim 21, wherein the set of carriers is identified based at least in part on determining that a set of uplink grants was received by the UE after a particular time,
wherein each uplink grant, of the set of uplink grants, is associated with a respective carrier of the set of carriers.

23. The non-transitory computer-readable medium of claim 22, wherein the particular time is a time at which a first grant was received after the PHR trigger was detected.

24. The non-transitory computer-readable medium of claim 21, wherein the set of carriers is identified based at least in part on determining that the UE has no uplink grants associated with the set of carriers.

25. The non-transitory computer-readable medium of claim 21, wherein the set of carriers is identified based at least in part on determining that a set of uplink grants was received by the UE after a threshold amount of time from a time at which an uplink grant, associated with the carrier, was received by the UE,
wherein each uplink grant, of the set of uplink grants, is associated with a respective carrier of the set of carriers.

26. The non-transitory computer-readable medium of claim 21,
wherein the particular uplink transmission is one of at least two uplink transmissions associated with the other carrier, wherein the at least two uplink transmissions at least partially overlap the uplink transmission associated with the carrier.

27. An apparatus for wireless communication, comprising:
   means for detecting a power headroom report (PHR) trigger,
      wherein the apparatus is configured to transmit uplink communications using a plurality of carriers;
   means for identifying, based at least in part on detecting the PHR trigger, a set of carriers, of the plurality of carriers, that is to be ignored when calculating a power headroom associated with a carrier of the plurality of carriers; and
   means for calculating the power headroom based at least in part on an uplink transmission, associated with the carrier, based at least in part on ignoring the set of carriers that is to be ignored, and based at least in part on a particular uplink transmission associated with another carrier of the plurality of carriers,
      wherein a subcarrier spacing, associated with the other carrier, is higher than a subcarrier spacing of the carrier.

28. The apparatus of claim 27, wherein the set of carriers is identified based at least in part on determining that a set of uplink grants was received by the UE after a particular time,
   wherein each uplink grant, of the set of uplink grants, is associated with a respective carrier of the set of carriers.

29. The apparatus of claim 27, wherein the particular uplink transmission is one of at least two uplink transmissions associated with the other carrier,
   wherein the at least two uplink transmissions at least partially overlap the uplink transmission associated with the carrier.

30. The apparatus of claim 29, wherein the particular uplink transmission is an uplink transmission, of the at least two uplink transmissions, with a smallest power headroom.

* * * * *